US012581279B2

(12) United States Patent
Fisher

(10) Patent No.: US 12,581,279 B2
(45) Date of Patent: Mar. 17, 2026

(54) SYSTEM FOR REAL TIME CORRECTION DURING NETWORK DEVICE PROVISIONING

(71) Applicant: ELECTROLUX CONSUMER PRODUCTS, INC., Charlotte, NC (US)

(72) Inventor: James Fisher, Mount Holly, NC (US)

(73) Assignee: ELECTROLUX CONSUMER PRODUCTS, INC., Charlotte, NC (US)

( * ) Notice: Subject to any disclaimer, the term of this patent is extended or adjusted under 35 U.S.C. 154(b) by 336 days.

(21) Appl. No.: 18/033,824

(22) PCT Filed: Oct. 26, 2021

(86) PCT No.: PCT/US2021/056537
§ 371 (c)(1),
(2) Date: Apr. 26, 2023

(87) PCT Pub. No.: WO2022/093734
PCT Pub. Date: May 5, 2022

(65) Prior Publication Data
US 2024/0015490 A1     Jan. 11, 2024

Related U.S. Application Data

(60) Provisional application No. 63/107,570, filed on Oct. 30, 2020.

(51) Int. Cl.
*H04W 4/50*         (2018.01)
*H04L 41/0806*      (2022.01)
(Continued)

(52) U.S. Cl.
CPC ........... *H04W 4/50* (2018.02); *H04L 41/0806* (2013.01); *H04W 48/16* (2013.01); *H04W 48/18* (2013.01); *H04W 76/19* (2018.02)

(58) Field of Classification Search
CPC ....... H04W 4/50; H04W 48/16; H04W 48/18; H04W 76/19; H04W 4/80; H04W 76/18;
(Continued)

(56) References Cited

U.S. PATENT DOCUMENTS 6,686,838 B1    2/2004  Rezvani et al.
7,363,354 B2    4/2008  Lahti
(Continued)

FOREIGN PATENT DOCUMENTS

EP       3358805 A1     8/2018
KR    20080025676 A     3/2008
WO     2020185225 A1    9/2020

OTHER PUBLICATIONS

Electrolux Home Products, Inc., International Patent Application No. PCT/US2021/056537, International Preliminary Report on Patentability, May 11, 2023.
(Continued)

*Primary Examiner* — Shawn D Miller
(74) *Attorney, Agent, or Firm* — Moore & Van Allen PLLC

(57)         ABSTRACT

A system for real time correction during a network device provisioning process is provided. The system includes a network device which maintains an access point connection with a user device while simultaneously attempting to establish a connection to a home network. The network device transmits status information regarding the provisioning process to the user device in real time and notifies the user of any failure in the provisioning process via an initial access point connection. The user is then given the opportunity to correct the issue without disconnecting entirely from the network device.

21 Claims, 2 Drawing Sheets

(51) Int. Cl.

| | |
|---|---|
| *H04W 48/16* | (2009.01) |
| *H04W 48/18* | (2009.01) |
| *H04W 76/19* | (2018.01) |

(58) Field of Classification Search

CPC .............. H04W 84/12; H04L 41/0806; H04L 12/2803; H04L 41/0803; H04L 67/34

See application file for complete search history.

(56) References Cited

U.S. PATENT DOCUMENTS

| | | | |
|---|---|---|---|
| 7,660,266 | B2 | 2/2010 | Ishida et al. |
| 8,014,722 | B2 | 9/2011 | Abel et al. |
| 8,250,163 | B2 | 8/2012 | Yamakawa et al. |
| 8,494,502 | B2 | 7/2013 | Abel et al. |
| 8,532,714 | B2 | 9/2013 | Sampat et al. |
| 8,805,454 | B2 | 8/2014 | Sampat et al. |
| 9,122,788 | B2 | 9/2015 | Elston et al. |
| 9,171,190 | B2 | 10/2015 | Drake et al. |
| 9,326,091 | B2 | 4/2016 | Donnellan et al. |
| 9,367,058 | B2 | 6/2016 | Kang et al. |
| 9,451,381 | B2 | 9/2016 | Cholas et al. |
| 9,600,726 | B2 | 3/2017 | Kirkby et al. |
| 9,671,766 | B2 | 6/2017 | Ha |
| 9,729,340 | B2 | 8/2017 | Britt et al. |
| 9,736,290 | B1 | 8/2017 | De Filippis et al. |
| 9,749,844 | B1 | 8/2017 | Sovani et al. |
| 9,769,245 | B2 | 9/2017 | Broker et al. |
| 9,826,341 | B2 | 11/2017 | Maddocks et al. |
| 9,936,383 | B2 | 4/2018 | Ramachandran |
| 9,951,451 | B2 | 4/2018 | Park et al. |
| 9,967,108 | B2 | 5/2018 | Ni |
| 10,034,118 | B2 | 7/2018 | Goluboff |
| 10,070,379 | B2 | 9/2018 | Cholas et al. |
| 10,084,904 | B2 | 9/2018 | De Filippis et al. |
| 10,129,746 | B2 | 11/2018 | Lee et al. |
| 10,129,750 | B2 | 11/2018 | Ramachandran |
| 10,177,932 | B2 | 1/2019 | Boeldt et al. |
| 10,228,671 | B2 | 3/2019 | Ha |
| 10,262,210 | B2 | 4/2019 | Kirkby et al. |
| 10,292,027 | B2 | 5/2019 | Goluboff |
| 10,321,467 | B2 | 6/2019 | Pearson et al. |
| 10,367,651 | B2 | 7/2019 | Francescangeli et al. |
| 10,477,599 | B2 | 11/2019 | Park et al. |
| 10,586,112 | B2 | 3/2020 | Kirkby et al. |
| 10,598,784 | B2 | 3/2020 | Yang et al. |
| 10,633,778 | B2 | 4/2020 | Park et al. |
| 10,652,340 | B2 | 5/2020 | Yang et al. |
| 10,700,791 | B2 | 6/2020 | Al-Mousa et al. |
| 10,705,494 | B2 | 7/2020 | Ha |
| 10,715,979 | B2 | 7/2020 | Karimli et al. |
| 10,785,313 | B2 | 9/2020 | Yang et al. |
| 10,820,265 | B2 | 10/2020 | Schneider |
| 2005/0044196 | A1 | 2/2005 | Pullen |
| 2006/0183477 | A1* | 8/2006 | Bocking ............... H04W 48/18 455/435.2 |
| 2006/0285489 | A1 | 12/2006 | Francisco |
| 2013/0173811 | A1 | 7/2013 | Ha et al. |
| 2016/0285628 | A1 | 9/2016 | Carrer et al. |
| 2016/0373270 | A1 | 12/2016 | Yang et al. |
| 2016/0374133 | A1 | 12/2016 | Logue |
| 2017/0048789 | A1* | 2/2017 | Tan ...................... H04B 17/318 |
| 2017/0048901 | A1 | 2/2017 | Finch et al. |
| 2019/0052476 | A1 | 2/2019 | Shu et al. |
| 2019/0053137 | A1* | 2/2019 | Watanabe ........... H04W 40/244 |
| 2019/0246346 | A1 | 8/2019 | Huang et al. |
| 2021/0029202 | A1* | 1/2021 | Banerjee ............... H04W 12/71 |

OTHER PUBLICATIONS

Electrolux Home Products, Inc., International Patent Application No. PCT/US2021/056537, International Search Report, Feb. 7, 2022.

Electrolux Home Products, Inc., International Patent Application No. PCT/US2021/056537, Written Opinion, Feb. 7, 2022.

Electrolux Home Products, Inc., Korean Application No. 10-2023-7013359, KR Office Action, Nov. 13, 2025.

\* cited by examiner

SYSTEM FOR REAL TIME CORRECTION DURING NETWORK DEVICE PROVISIONING

CROSS-REFERENCE TO RELATED APPLICATION

This application is a National Stage Patent Application (filed under 35 § U.S.C. 371) of PCT/US2021/056537 filed Oct. 26, 2021 of the same title, which claims the benefit of U.S. Provisional Patent Application No. 63/107,570 for a "System for Real Time Correction During Network Device Provisioning," filed Oct. 30, 2020, the contents of each of which are hereby incorporated by reference in their entirety.

FIELD OF THE INVENTION

In general, the present invention is directed a system for provisioning a network device to a network. Specifically, in some embodiments, the present invention is directed to a system for notifying the user of any failure in the provisioning process and allowing the user to correct the issue without disconnecting entirely from the network device being provisioned.

BACKGROUND

Various home internet and/or cloud ready network devices need to be provisioned to a network, such as a user's home network during network device setup, often by the user. Typically, when provisioning fails, the user is required to start the process over again from the beginning without being allowed the opportunity to troubleshoot.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

In a first aspect, the present invention embraces a network device including a memory, a communication module, and a processor. The memory may include computer-readable code stored thereon, and the processor may be configured to execute the computer-readable code to establish an access point connection with a user device and receive, via the access point connection and from the user device, network information. In some embodiments, the processor may be configured to execute the computer-readable code to, while maintaining the access point connection, attempt to establish, using the network information, a network connection with a network and, if the attempt to establish the network connection fails, transmit a first error notification to the user device via the access point connection. Additionally, or alternatively, the processor may be configured to execute the computer-readable code to, while maintaining the access point connection, if the attempt to establish the network connection succeeds, attempt to establish a connection to a remote server via the network connection.

In some embodiments of the first aspect, either alone or in combination with any other embodiment(s) of the first aspect, the processor may be configured to execute the computer-readable program code to, if the attempt to establish the connection to the remote server fails, transmit a second error notification to the user device via the access point connection and, if the attempt to establish the connection to the remote server succeeds, transmit a verification to the user device via the access point connection.

In some embodiments of the first aspect, either alone or in combination with any other embodiment(s) of the first aspect, the processor may be configured to execute the computer-readable program code to, if the attempt to establish the network connection fails and after transmitting the first error notification to the user device, receive, from the user device and via the access point connection, additional information and attempt to establish, using the additional information, another network connection with the network.

In some embodiments of the first aspect, either alone or in combination with any other embodiment(s) of the first aspect, the network device is an appliance.

In some embodiments of the first aspect, either alone or in combination with any other embodiment(s) of the first aspect, the access point connection is a Wi-Fi connection or a Bluetooth connection.

In some embodiments of the first aspect, either alone or in combination with any other embodiment(s) of the first aspect, the processor may be configured to execute the computer-readable program code to, when establishing the access point connection, establish the access point connection based on a selection, at the user device, by the user from a list displayed on the user device.

In some embodiments of the first aspect, either alone or in combination with any other embodiment(s) of the first aspect, the network device may include an input unit and an access point module, and the processor may be configured to execute the computer-readable program code to, before establishing the access point connection, receive, with the input unit, activation of the access point module.

In some embodiments of the first aspect, either alone or in combination with any other embodiment(s) of the first aspect, the processor may be configured to execute the computer-readable program code to, after establishing the first communication channel, perform a network scan to identify available networks and transmit, to the user device and via the access point connection, a list of the available networks for display on the user device.

In some embodiments of the first aspect, either alone or in combination with any other embodiment(s) of the first aspect, the network information may be selected by a user at the user device.

In some embodiments of the first aspect, either alone or in combination with any other embodiment(s) of the first aspect, the verification is a second verification and the processor may be configured to execute the computer-readable program code to, if the attempt to establish the network connection succeeds, transmit, to the user device and via the access point connection, a first verification for display on the user device and, when transmitting the second verification to the user device, transmit the second verification for display on the user device.

In some embodiments of the first aspect, either alone or in combination with any other embodiment(s) of the first aspect, the processor may be configured to execute the computer-readable program code to, when transmitting the first error notification to the user device, cause the user device to display a description of an error, where the description of the error includes an error type, an error description, a recommended solution for the error, and/or the like.

In some embodiments of the first aspect, either alone or in combination with any other embodiment(s) of the first aspect, the processor may be configured to execute the computer-readable program code to, when transmitting the second error notification to the user device, cause the user device to display a description of an error, where the description of the error includes an error type, an error description, a recommended solution for the error, and/or the like.

In some embodiments of the first aspect, either alone or in combination with any other embodiment(s) of the first aspect, the user device may be configured to maintain a log including the first error notification and the second error notification and transmit the log to the remote server.

In some embodiments of the first aspect, either alone or in combination with any other embodiment(s) of the first aspect, the processor may be configured to execute the computer-readable program code to, after transmitting the verification to the user device via the access point connection, disconnect the access point connection and thereafter communicate with the user device via the network.

In some embodiments of the first aspect, either alone or in combination with any other embodiment(s) of the first aspect, the processor may be configured to execute the computer-readable program code to, if the attempt to establish the network connection succeeds, store the network information in the memory.

In some embodiments of the first aspect, either alone or in combination with any other embodiment(s) of the first aspect, the processor may be configured to execute the computer-readable program code to receive, from the user device and via the access point connection, remote server information and, when attempting to establish the connection to the remote server, attempt to establish the connection to the remote server using the remote server information.

In a second aspect, the present invention embraces a method for provisioning a network device on a network. The method may include activating an access point module on a network device and selecting, via a user interface of a user device and from a list displayed on the user interface, the network device. In some embodiments, the method may include establishing, with the user device, an access point connection to the network device via the access point module and selecting, via the user interface of the user device and from another list displayed on the user interface, a network to which the network device is to be connected. Additionally, or alternatively, the method may include providing, via the user interface of the user device, network information for the network and sending, with the user device, the network information to the network device via the access point connection. In some embodiments, the method may include attempting to establish, with the network device using the network information, a network connection to the network. Additionally, or alternatively, the method may include, while the user device maintains the access point connection and if the attempt to establish the network connection fails, receiving, via the user interface of the user device, a first error notification transmitted by the network device to the user device via the access point connection. In some embodiments, the method may include, while the user device maintains the access point connection and if the attempt to establish the network connection succeeds, receiving, via the user interface of the user device, a first verification transmitted by the network device to the user device via the access point connection and attempting to establish, by the network device, a connection to a remote sever via the network connection. Additionally, or alternatively, the method may include, while the user device maintains the access point connection and if the attempt, by the network device, to establish the connection to the remote sever via the network connection fails, receiving, via the user interface of the user device, a second error notification transmitted by the network device to the user device via the access point connection. In some embodiments, the method may include, while the user device maintains the access point connection and if the attempt, by the network device, to establish the connection to the remote server via the network connection succeeds, receiving, via the user interface of the user device, a second verification transmitted by the network device to the user device via the access point connection.

In some embodiments of the second aspect, either alone or in combination with any other embodiment(s) of the second aspect, activating the access point module on the network device may include using a user input of the network device to activate the access point module.

In some embodiments of the second aspect, either alone or in combination with any other embodiment(s) of the second aspect, the first error notification and/or the second error notification may include a recommended solution for an error, and the method may include performing the recommended solution.

In a third aspect, the present invention embraces a computer program product for provisioning a network device on a network that includes a non-transitory computer-readable medium. The non-transitory computer-readable medium may include code configured to cause a processor to establish, using an access point module, an access point connection with a user device, where the access point connection includes a Wi-Fi connection to the user device or a Bluetooth connection to the user device and receive, using the access point module, via the access point connection, and from the user device, network information selected by a user at the user device. In some embodiments, the non-transitory computer-readable medium may include code configured to cause the processor to, while maintaining the access point connection, attempt to establish, using a communication module and using the network information, a Wi-Fi connection with a network and if the attempt to establish the Wi-Fi connection fails, transmit, using the access point module, a first error notification to the user device via the access point connection. Additionally, or alternatively, the non-transitory computer-readable medium may include code configured to cause the processor to, while maintaining the access point connection and if the attempt to establish the Wi-Fi connection succeeds, attempt to establish, using the communication module, a connection to a remote server via the Wi-Fi connection. In some embodiments, the non-transitory computer-readable medium may include code configured to cause the processor to, while maintaining the access point connection and if the attempt to establish the connection to the remote server fails, transmit, using the access point module, a second error notification to the user device via the access point connection. Additionally, or alternatively, the non-transitory computer-readable medium may include code configured to cause the processor to, while maintaining the access point connection and if the attempt to establish the connection to the remote server succeeds, transmit, using the access point module, a verification to the user device via the access point connection The features, functions, and advantages that have been discussed may be achieved independently in various embodiments of the present invention or may be combined with yet other embodiments, further details of which may be seen with reference to the following description and drawings.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, the invention provides a system for provisioning a device to a network, such as network device to a home network. Specifically, in some embodiments, the network device maintains an access point connection with a user device while simultaneously establishing a second connection to a network and a remote server. By maintaining the first access point connection, the network device is able to transmit status information regarding the provisioning process to the user device in real time, allowing the user to troubleshoot without fully disconnecting the network device.

In some embodiments, the present invention eliminates delays in prior provisioning processes by allowing a user device to remain in operative communication with a network device via an access point connection at the same time that the network device is establishing communication with a network over a secondary connection. As an example, in prior provisioning processes, a network connection may fail for any variety of reasons, but the user is often only notified that the process was unsuccessful. At that point, the user must completely disconnect from the network device and attempt the process a second time without knowing what caused the initial failure. Further, the provider of the network device, with which the network device may communicate during provisioning, may not be able to determine the failure cause or provide such information to the user. The invention described herein eliminates this problem by maintaining an initial connection between the network device and user device and transmitting status information to the user device during various steps in the provisioning process. In this way, the user may be made aware of the exact nature of the failure and may be given the opportunity to correct it, while the network device pauses the network connection process. In some embodiments, the network connection process may pause until the user takes a corrective action. Additionally, or alternatively, the network device may continue attempting to complete the connection process repeatedly until successful. The benefits of this system also include the ability of the user device to maintain a data log of error information, which can then be transmitted to a remote server for use in product improvement.

Figure 1:
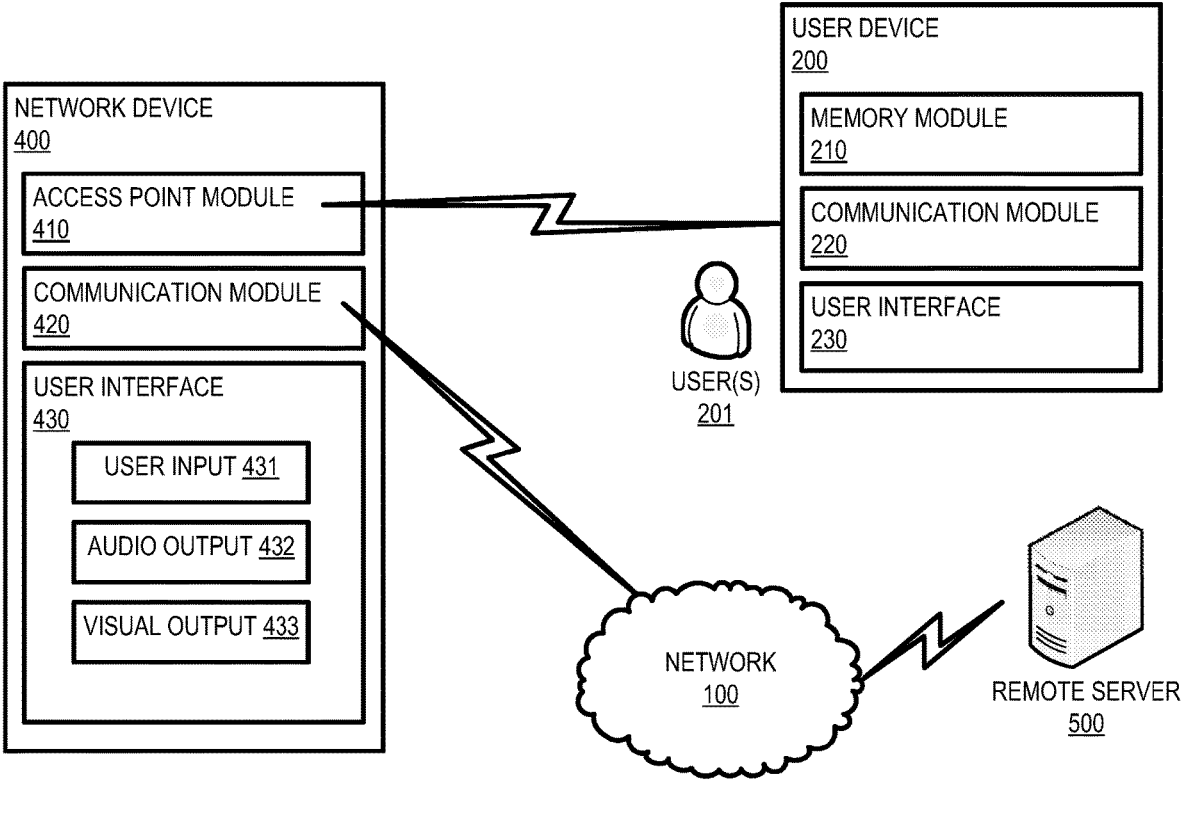
FIG. 1 illustrates an operating environment for the provisioning system, in accordance with some embodiments.

FIG. 1 shows an operating environment for the provisioning system, in accordance with some embodiments. "Network device" as used herein may refer to various devices or apparatuses which may be used in a home or office setting to perform specific functions. As an example, the network device 400 may be an appliance, such as a refrigerator, a freezer, a washing machine, a dryer, a microwave, an oven, a toaster oven, a range, a cooktop, a printer, a scanner, a TV, a radio, and/or the like. Each network device 400 may include an access point module 410 which may be configured to allow data communication with a user device 200. Each network device 400 may also include a communication module 420, which may be configured to allow the network device to connect with a network, such as a home network 100. Additionally, the network device 400 may include a user interface 430. The user interface 430 may include an audio output 432 capable of producing a variety of beeps or other sounds, as well as a visual output 433 that may include an indicator light, display screen, and/or the like. In some embodiments, the network device 400 may include a user input 431 on the user interface 430. The user input 431 may include a button, dial, switch, and/or the like to allow a user 201 to provide input to the network device.

The user device 200 may be an external electronic device owned and/or operated by the user 201. Accordingly, the user device 200 may be a laptop or desktop computer, smartphone, tablet, smart device, IoT device, single-board computer (SBC), and/or the like. The user device 200 may be in operative communication with the access point module 410 via a wireless communication channel such as a cellular network, Wi-Fi network, Bluetooth connection, NFC connection, and/or the like. In some embodiments, the user device 200 may be in operative communication with access point module 410 via a wired communication channel, such as a USB cable, Ethernet cable, and/or other type of wired data connection. In this way, the user 201 may use the user device 200 to remotely view network device data for a particular network device 400 (e.g., model number, MAC address, etc.) as well as issue commands to change settings or a configuration of the network device 400. The communication link between the user device 200 and the access point module 410 may be maintained independently of the status of the connection between the network device 400 and the network 100.

The user device 200 may include a communication module 220 and a memory 210. The user device 200 may include a user interface 230 which serves to interact with the user 201. The user interface 230 may include the hardware and software components to accept input from and provide output to the user. Accordingly, the user interface 230 may include hardware, such as a display, audio output devices, projectors, and/or the like, or input devices, such as keyboards, mice, sensors, cameras, microphones, biometric input devices (e.g., fingerprint readers), and/or the like. The user interface 230 may include software such as a graphical or command-line interface through which the user may provide inputs and/or receive outputs from the user device 200. The user interface 230 may include an integrated display (e.g., a tablet or smartphone screen) within the user device 200, an external display device (e.g., a computer monitor or television), and/or the like.

A remote server 500 may be operated by the network device manufacturer or any other third party and may be connected to the network device 400 via the network 100. "Network" as used herein may refer to a global area network (GAN), such as the Internet, a wide area network (WAN), a local area network (LAN), other types of network, and/or the like. The network 100 may provide for wireline, wireless, and/or a combination wireline and wireless communication between devices on the network.

Figure 2:
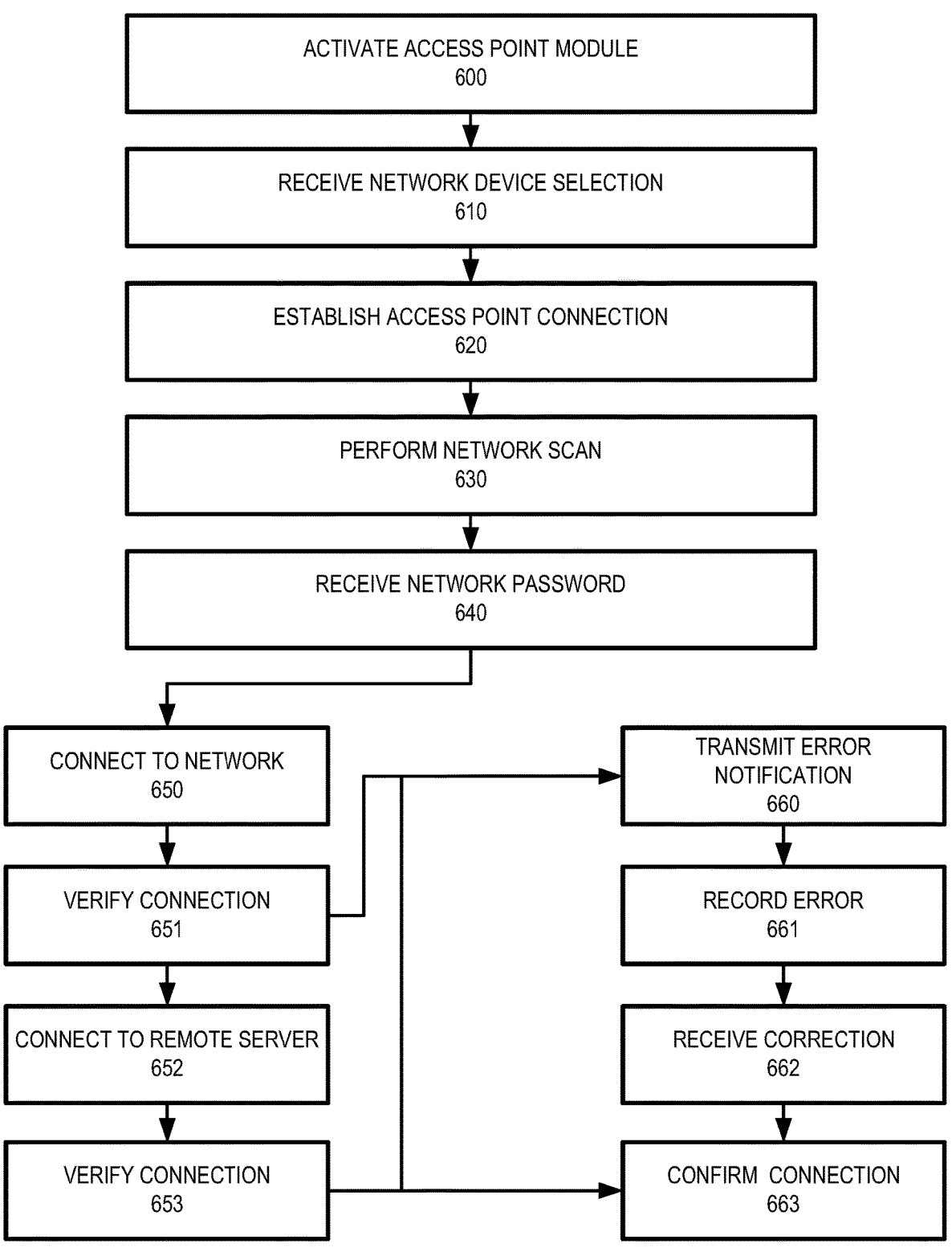
FIG. 2 depicts a high-level process flow for a method of provisioning a network device to a network.

FIG. 2 is a high-level process flow illustrating an exemplary method of provisioning a network device 400 to a home network 100. In some embodiments, and as shown in step 600, the user 201 activates the access point module 410 via the user input 431. For example, the user 201 may activate the access point module 410 via the user input 431 by pressing and holding a button for a predetermined amount of time, activating a switch, and/or the like. The network device may provide an auditory or visual confirmation of activation via the audio output 432 and/or the visual output 433. The confirmation of activation may include a beeping sound, a flashing light, and/or the like. After activation of the access point module, and as shown in step 610, the user may select the network device 400 from a list of activated network devices displayed on a user interface 230 of the user device 200. In this regard, the user may have downloaded an application (e.g., provided by a company associated with the network device 400) to the user device 200, and the application may cause the user device 200 to display the list of activated network devices on the user interface 230. The list of activated network devices may include network device pictures, descriptions, model numbers, MAC addresses, SSIDs, and/or the like. After selection of a network device, and as shown in step 620, the communication module 220 of the user device 200 may connect to the network device 400 via the access point module 410 and maintain the connection for the duration of the provisioning process.

In some embodiments, and as shown in step 630, the network device 400 may perform a network scan (e.g., using via the communication module 420) and cause the user interface 230 of the user device 200 to display a list of discovered networks. During this step, the audio output 432 and visual output 433 may output a combination of lights and/or sounds in order to indicate to the user that the network scan is occurring. After the list of discovered networks is displayed on the user interface 230, the user may be prompted to input network information, such as a password, as shown in step 640, allowing the network device to access the network 100. Additionally, or alternatively, the password for the discovered network 100 may be accessed by the memory 210 of the user device and then preloaded into a password field.

As shown in step 650, after receipt of the network password, the network device may attempt to connect to the network (e.g., using the communication module 420). If the connection to the network is successful, the network device may communicate a first verification to the user device via the established access point connection, as shown in step 651. For example, the first verification may appear on the user interface of the user device in the form of a progress bar, checklist, graphic, and/or the like. In some embodiments, and as shown in step 652, the network device may then attempt to connect to a remote server via the established network connection. In some embodiments, the network device may receive, from the user device and via the access point connection, remote server information (e.g., an Internet address, connection protocols, and/or the like) and, when attempting to establish the connection to the remote server, attempt to establish the connection to the remote server using the remote server information. If the connection to the remote server is successful, the network device may communicate a second verification to the user device via the established access point connection as shown in step 653.

For example, the second verification may appear with the first verification on the user interface and/or the second verification may trigger a new graphic and/or display indicating that the provisioning process is complete as shown in step 663. In some embodiments, after receiving the second verification and/or confirmation of the connection of the network device to the remote server, the user device 200 may disconnect from the access point module 410 and, thereafter, interact with the network device 400 solely via the remote server through the network 100.

Additionally, or alternatively, if the connection to the network attempted in step 650 and/or the connection to the remote server attempted in step 652 are unsuccessful, the network device may communicate an error notification to the user device 200 via the established access point connection as shown in step 660. In some embodiments, the user device 200 may record the error (e.g., in the memory 210) as shown in step 661. Additionally, or alternatively, the user interface may then display a description of the error to the user, where the description may include information such as error type, error description, a recommended solution for the error, and/or the like. For example, the recommended solution may include re-entering the network password, selecting a different home network, another similar troubleshooting action, and/or the like.

Stated differently, the network device maintains the established access point connection to the user device while attempting to connect to the network and while attempting to connect to the remote server. In this way, the network device may communicate error notifications to the user device via the established access point connection allowing the user to troubleshoot without disconnecting from the network device. As noted, in prior provisioning processes, a network connection and/or a remote server connection may fail for any variety of reasons, but the user is often only notified that the process was unsuccessful. At that point in prior provisioning processes, the user must completely disconnect from the network device and attempt the process a second time without knowing what caused the initial failure, which delays the provisioning process. In contrast, the process shown in FIG. 2 eliminates this problem by maintaining the connection between the network device and user device and transmitting status information to the user device during various steps in the provisioning process. In this way, the user may be made aware of the exact nature of the failure and may be given the opportunity to correct it.

In some embodiments, the network device will continue to attempt to complete the network connection as shown in step 650 and/or attempt to complete the connection to the remote server as shown in step 652 at predetermined time intervals such as 10 seconds or like, until connection is successful. Additionally, or alternatively, the network device may repeat an attempt to complete the network connection as shown in step 650 and/or repeat an attempt to complete the connection to the remote server as shown in step 652 in response to a user input on the user interface 230 indicating that recommended solution steps have been completed, where the user input is transmitted to the network device via the access point connection. Prior to receiving the user input on the user interface 230 indicating that recommended solution steps have been completed, the network device may pause the connection process.

The disclosure herein and the figures reference separate access point and communication modules. It is discussed in these terms to emphasize the two communication channels that are established. As will be appreciated, the access point and communication module may be the same module in some embodiments. In such embodiments, the communication module performs both communications with the user device and the remote server as described herein. The communication module may include functionality for creating a first communication channel with the user device, such as a Bluetooth or Wi-Fi connection. The communication module may also include functionality for creating a second communication channel with the remote server via a network and a Wi-Fi connection.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

10

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed:
1. A network device, comprising:
a memory comprising computer-readable program code stored thereon;

a communication module; and a processor configured to execute the computer-readable program code to:

establish an access point connection with a user device;

receive, via the access point connection and from the user device, network information;

while maintaining the access point connection:

attempt to establish, using the network information, a network connection with a network;

if the attempt to establish the network connection fails, transmit a first error notification to the user device via the access point connection to cause the user device to display a description of an error;

if the attempt to establish the network connection succeeds, attempt to establish a connection to a remote server via the network connection;

if the attempt to establish the connection to the remote server fails, transmit, via the access point connection, a second error notification to the user device to cause the user device to display a corresponding description of an error; and if the attempt to establish the connection to the remote server succeeds, transmit a verification to the user device via the access point connection.

2. The network device of claim 1, wherein the description of the error comprises at least one of an error type, an error description, or a recommended solution for the error.

3. The network device of claim 1, wherein the verification is a second verification, and wherein the processor is configured to execute the computer-readable program code to:

if the attempt to establish the network connection succeeds, transmit, to the user device and via the access point connection, a first verification for display on the user device; and when transmitting the second verification to the user device, transmit the second verification for display on the user device.

4. The network device of claim 1, wherein the processor is configured to execute the computer-readable program code to, when transmitting the second error notification to the user device, cause the user device to display a description of an error, wherein the description of the error comprises at least one of an error type, an error description, or a recommended solution for the error.

5. The network device of claim 1, wherein the user device is configured to maintain a log comprising the first error notification and the second error notification and transmit the log to the remote server.

6. The network device of claim 1, wherein the processor is configured to execute the computer-readable program code to, after transmitting the verification to the user device via the access point connection, disconnect the access point connection and thereafter communicate with the user device via the network.

7. The network device of claim 1, wherein the processor is configured to execute the computer-readable program code to, if the attempt to establish the network connection fails and after transmitting the first error notification to the user device:

receive, from the user device and via the access point connection, additional information; and attempt to establish, using the additional information, another network connection with the network.

8. The network device of claim 1, wherein the network device is an appliance.

9. The network device of claim 1, wherein the access point connection is a Wi-Fi connection or a Bluetooth connection.

10. The network device of claim 1, wherein the processor is configured to execute the computer-readable program code to, when establishing the access point connection, establish the access point connection based on a selection, at the user device, by the user from a list displayed on the user device.

11. The network device of claim 1, comprising an input unit, wherein the processor is configured to execute the computer-readable program code to, before establishing the access point connection, receive, with the input unit, activation.

12. The network device of claim 1, wherein the processor is configured to execute the computer-readable program code to, after establishing the access point connection:

perform a network scan to identify available networks; and transmit, to the user device and via the access point connection, a list of the available networks for display on the user device.

13. The network device of claim 1, wherein the network information is selected by a user at the user device.

14. The network device of claim 1, wherein the description of the error comprises a recommended solution including at least one out of re-entering a network password and selecting a different home network and wherein the processor is configured to execute the computer-readable program code to, after transmitting the first error notification, receive, via the access point connection and from the user device, new network information including the network password or selection of the different home network and to attempt to establish, using the new network information, the network connection.

15. The network device of claim 1, wherein the processor is configured to execute the computer-readable program code to, if the attempt to establish the network connection succeeds, store the network information in the memory.

16. The network device of claim 1, wherein the processor is configured to execute the computer-readable program code to:

receive, from the user device and via the access point connection, remote server information; and when attempting to establish the connection to the remote server, attempt to establish the connection to the remote server using the remote server information.

17. A system comprising the network device of claim 1 and a user device, wherein the user device comprises a memory and a user interface.

18. A method for provisioning a network device on a network, the method comprising:

activating a network device;

establishing, with a user device, an access point connection to the network device;

sending, with the user device, network information for a network to which the network device is to be connected to the network device via the access point connection;

attempting to establish, with the network device using the network information, a network connection to the network;

while the user device maintains the access point connection:

if the attempt to establish the network connection fails, communicating a first error notification by the network device to the user device via the access point connection and displaying a corresponding description of an error on a user interface of the user device;

if the attempt to establish the network connection succeeds, attempting to establish, by the network device, a connection to a remote server via the network connection;

if the attempt, by the network device, to establish the connection to the remote server via the network connection fails, communicating a second error notification by the network device to the user device via the access point connection and displaying a corresponding description of an error on the user interface of the user device; and if the attempt, by the network device, to establish the connection to the remote server via the network connection succeeds, communicating a verification by the network device to the user device via the access point connection and displaying the verification on the user interface of the user device.

19. The method of claim 18, wherein activating the network device comprises using a user input of the network device.

20. The method of claim 18, wherein at least one of the first error notification or the second error notification comprises a recommended solution for an error, and wherein the method comprises performing the recommended solution.

21. A computer program product for provisioning a network device on a network, the computer program product comprising a non-transitory computer-readable medium comprising code configured to cause a processor to:

establish an access point connection with a user device, wherein the access point connection comprises a Wi-Fi connection to the user device or a Bluetooth connection to the user device;

receive via the access point connection, and from the user device, network information selected by a user at the user device;

while maintaining the access point connection:

attempt to establish, using a communication module and using the network information, a Wi-Fi connection with a network;

if the attempt to establish the Wi-Fi connection fails, transmit a first error notification to the user device via the access point connection to cause the user device to display a corresponding description of an error on a user interface of the user device;

if the attempt to establish the Wi-Fi connection succeeds, attempt to establish, using the communication module, a connection to a remote server via the Wi-Fi connection;

if the attempt to establish the connection to the remote server fails, transmit a second error notification to the user device via the access point connection to cause the user device to display a corresponding description of an error on the user interface of the user device; and if the attempt to establish the connection to the remote server succeeds, transmit a verification to the user device via the access point connection.

* * * * *